(12) United States Patent
Nishimiya

(10) Patent No.: US 10,835,965 B2
(45) Date of Patent: Nov. 17, 2020

(54) CHUCK MECHANISM

(71) Applicant: KITAGAWA IRON WORKS CO., LTD., Fuchu (JP)

(72) Inventor: Tamio Nishimiya, Fuchu (JP)

(73) Assignee: KITAGAWA IRON WORKS CO., LTD., Fuchu (JP)

(*) Notice: Subject to any disclaimer, the term of this patent is extended or adjusted under 35 U.S.C. 154(b) by 0 days.

(21) Appl. No.: 16/604,960

(22) PCT Filed: Apr. 18, 2018

(86) PCT No.: PCT/JP2018/015996
§ 371 (c)(1),
(2) Date: Oct. 11, 2019

(87) PCT Pub. No.: WO2018/207570
PCT Pub. Date: Nov. 15, 2018

(65) Prior Publication Data
US 2020/0061720 A1    Feb. 27, 2020

(30) Foreign Application Priority Data
May 10, 2017   (JP) ................................ 2017-094184

(51) Int. Cl.
*B23B 31/16*   (2006.01)
*B23B 31/177*  (2006.01)

(52) U.S. Cl.
CPC .. *B23B 31/16279* (2013.01); *B23B 31/16241* (2013.01); *B23B 31/16275* (2013.01);
(Continued)

(58) Field of Classification Search
CPC ........ B23B 31/16241; B23B 31/16245; B23B 31/16275; B23B 31/16279; Y10T 279/1973; Y10T 279/1986
See application file for complete search history.

(56) References Cited

U.S. PATENT DOCUMENTS 994,911 A * 6/1911 Dusenbery ........ B23B 31/16275
                                                         279/123
1,261,265 A * 4/1918 Miller ............... B23B 31/16279
                                                         279/123
(Continued)

FOREIGN PATENT DOCUMENTS

DE      2509698 A1 * 9/1976 ....... B23B 31/16279
DE      2813832 A1   10/1979
(Continued)

*Primary Examiner* — Eric A. Gates
(74) *Attorney, Agent, or Firm* — Maschoff Brennan

(57) ABSTRACT

A chuck mechanism of the present invention includes multiple master jaws placed movably in a radial direction on a front surface of a chuck body, and top jaws each detachably attached to front surfaces of the top jaws. Each master jaw and each top jaw have a raised portion and a recessed portion engageable with each other. Each of the raised and recessed portions has conical surfaces formed by part of a conical body. Each top jaw has a gripping surface formed by part of a circular columnar body. Upon work gripping, the center axes of the conical surfaces on a gripping side among the conical surfaces of each master jaw and each top jaw and the center axis of the gripping surface are all coincident with a rotation axis of the chuck body.

12 Claims, 11 Drawing Sheets

(52) U.S. Cl.
CPC ... *B23B 31/16245* (2013.01); *Y10T 279/1973* (2015.01); *Y10T 279/1986* (2015.01)

(56) References Cited

U.S. PATENT DOCUMENTS

| | | | | |
|---|---|---|---|---|
| 2,954,983 A | * | 10/1960 | Roby | ................ B23B 31/16245 |
| | | | | 279/121 |
| 4,982,970 A | * | 1/1991 | Otani | ................ B23B 31/16279 |
| | | | | 279/121 |
| 5,015,003 A | * | 5/1991 | Ramunas | .......... B23B 31/16275 |
| | | | | 269/284 |
| 5,842,705 A | | 12/1998 | Tabachenko et al. | |
| 5,899,464 A | * | 5/1999 | DeFeo | .............. B23B 31/16241 |
| | | | | 279/124 |
| 8,152,175 B1 | | 4/2012 | Maro et al. | |

FOREIGN PATENT DOCUMENTS

| | | | | |
|---|---|---|---|---|
| DE | 20 2014 006 536 U1 | | 12/2015 | |
| EP | 0038269 A1 | * | 10/1981 | ....... B23B 31/16279 |
| EP | 3 556 495 A1 | | 10/2019 | |
| FR | 39934 E | | 12/1931 | |
| JP | H01-306106 A | | 12/1989 | |
| JP | H09-155608 A | | 6/1997 | |
| WO | WO-2014081318 A1 | * | 5/2014 | ....... B23B 31/16279 |

\* cited by examiner

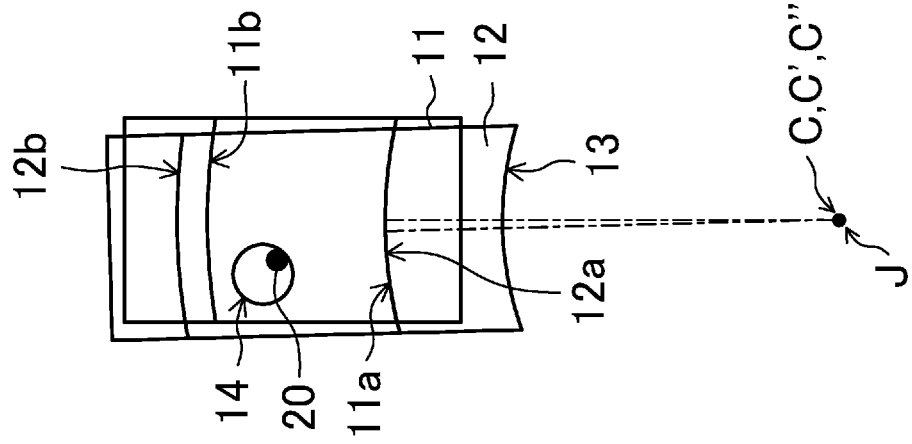
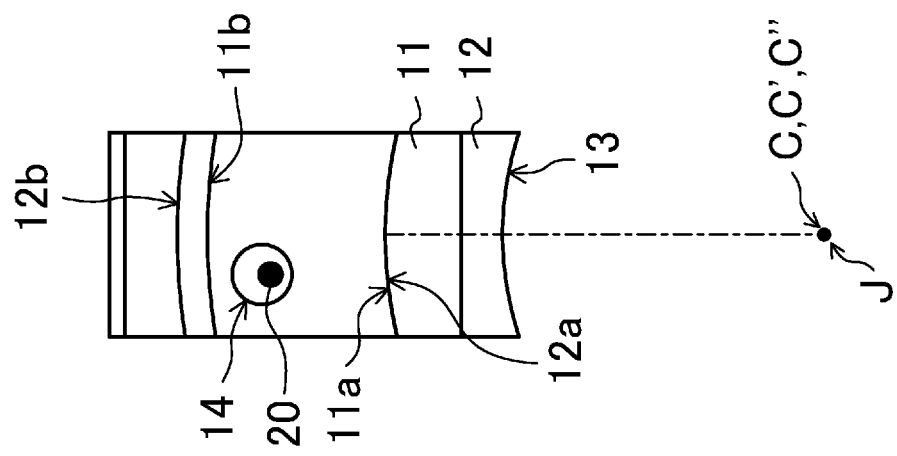
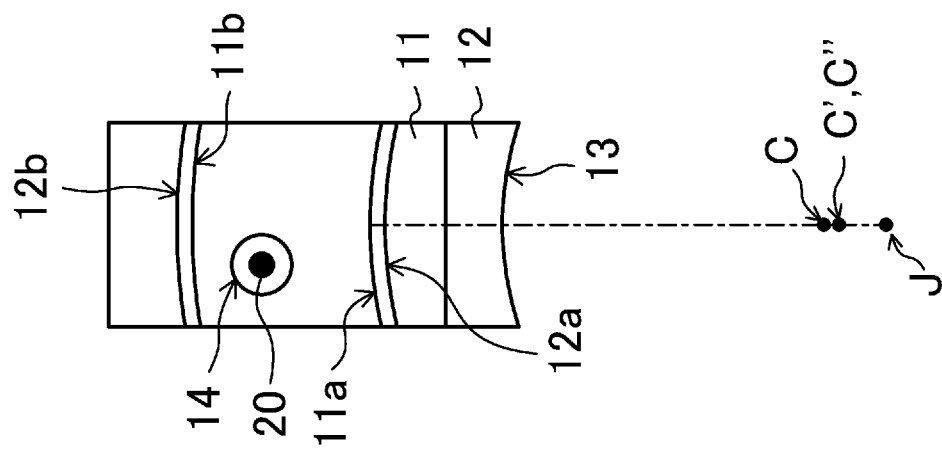

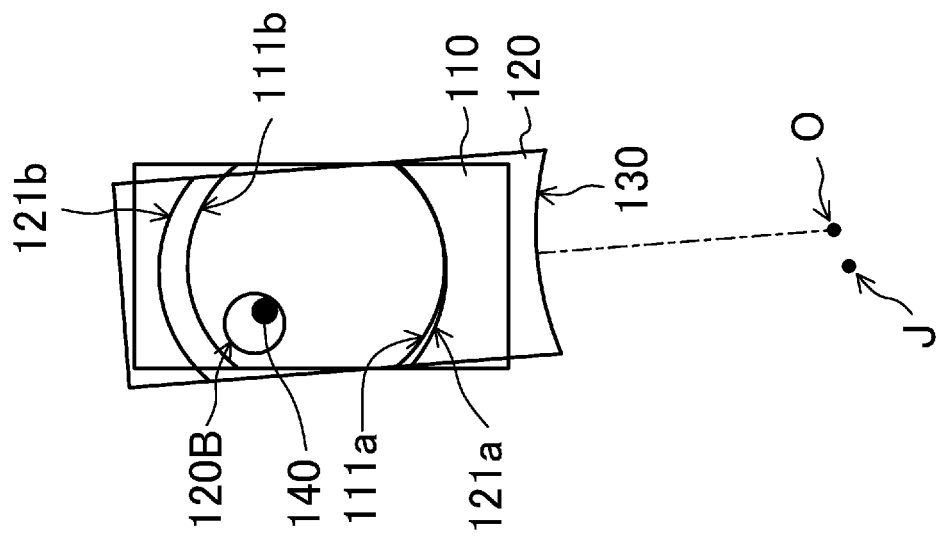
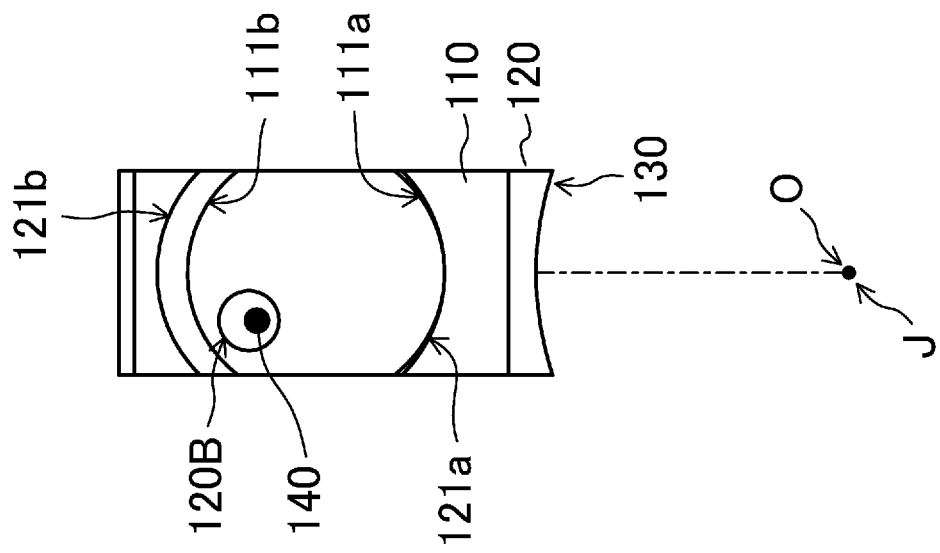
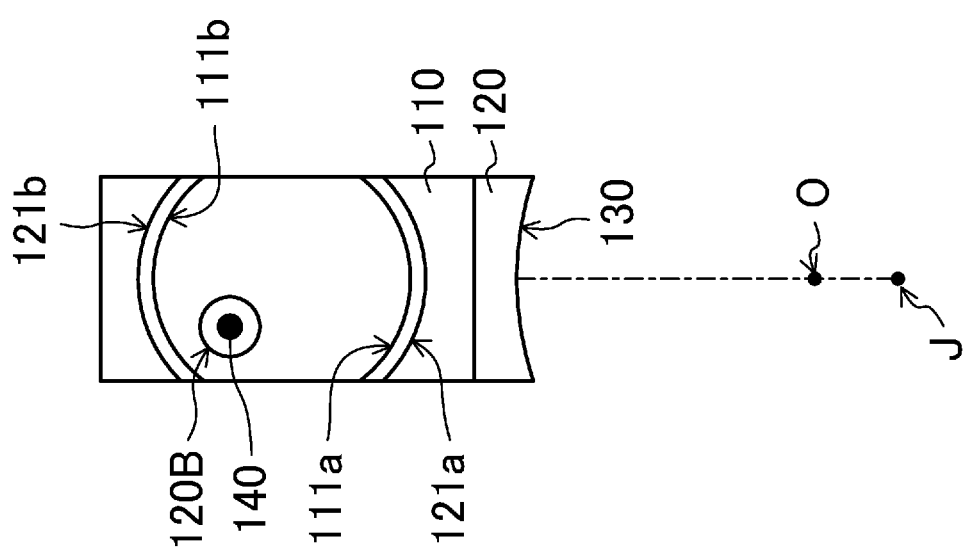

CHUCK MECHANISM

TECHNICAL FIELD

The present invention relates to a chuck mechanism configured to grip a workpiece (a work).

BACKGROUND ART

A chuck mechanism configured to grip a work includes multiple master jaws placed movably in a radial direction on a front surface of a chuck body, and top jaws each detachably attached to front surfaces of the master jaws.

Patent Document 1 discloses a chuck mechanism capable of quickly performing attachment/detachment of a top jaw. As illustrated in FIG. 10, the chuck mechanism disclosed in such a document is configured such that a raised portion 110A and a recessed portion 120A engaging with each other are each formed at a master jaw 110 placed on a front surface of a chuck body 100 and a top jaw 120.

As illustrated in FIG. 11A, the raised portion 110A formed at the master jaw 110 has, at both end portions thereof in a radial direction, conical surfaces 111a, 111b formed by part of a conical body. On the other hand, as illustrated in FIG. 11B, the recessed portion 120A formed at the top jaw 120 has, at both end portions thereof in the radial direction, conical surfaces 121a, 121b formed by part of a conical body. With this configuration, the top jaw 120 is rotated about the center axis of the conical body so that attachment/detachment of the top jaw 120 can be quickly performed.

A certain clearance (hereinafter referred to as an "engagement clearance") for quickly performing attachment/detachment of the top jaw 120 by rotation thereof is provided between the conical surface 111a, 111b of the raised portion 110A and the conical surface 121a, 121b of the recessed portion 120A. Moreover, at a position at which the top jaw 120 is attached to the master jaw 110, a positioning pin 140 provided on a master jaw 110 side is inserted into a hole 120B formed on a top jaw 120 side, and in this manner, the position of the top jaw 120 is determined.

CITATION LIST

Patent Document

PATENT DOCUMENT 1: Japanese Unexamined Patent Publication No. H1-306106

SUMMARY OF THE INVENTION

Technical Problem

In the chuck mechanism disclosed in Patent Document 1, when the top jaw 120 grips a work, the work-side conical surface of the conical surfaces 121a, 121b formed at the recessed portion 120A of the top jaw 120 is pressed against the conical surface 111a (111b) formed at the raised portion 110A of the master jaw 110 by reactive force from the work. Accordingly, the top jaw 120 firmly engages with the master jaw 110 in the radial direction and an axial direction. However, the positioning pin 140 and the hole 120B for determining the position of the top jaw 120 have a certain clearance (hereinafter referred to as a "pin clearance"), and for this reason, there are the following problems. Hereinafter, the problems in the typical chuck mechanism will be described with reference to FIGS. 12A to 12C.

FIG. 12A is a schematic plan perspective view of a position relationship between the master jaw 110 and the top jaw 120 before the work is gripped. The conical surfaces 111a, 111b are formed at both ends of the master jaw 110 in the radial direction, and the conical surfaces 121a, 121b are formed at both ends of the top jaw 120 in the radial direction. The certain engagement clearance is provided between the conical surface 111a, 111b of the master jaw 110 and the conical surface 121a, 121b of the top jaw 120. Moreover, the certain pin clearance is provided between the positioning pin 140 and the hole 120B. Further, a gripping surface 130 formed by part of a circular columnar body is formed at the top jaw 120, and the center axis O of the circular columnar body having the gripping surface 130 is shifted from a rotation axis J of the chuck body.

In this state, when the top jaw 120 grips the work, the conical surface 121a formed at the recessed portion 120A of the top jaw 120 is pressed against the conical surface 111a formed at the raised portion 110A of the master jaw 110 by the reactive force from the work as illustrated in FIG. 12B. At this point, the center axis O of the gripping surface 130 formed at the top jaw 120 is coincident with the rotation axis J of the chuck body.

However, actually in a state before the work is gripped, the top jaw 120 has the degree of freedom in the radial direction or a rotation direction due to influence such as the force of gravity, the engagement clearance, and the pin clearance, and for this reason, the position of the top jaw 120 is not stable. In such a state, when the top jaw 120 grips the work, the work is gripped with the center axis O of the gripping surface 130 formed at the top jaw 120 being shifted from the rotation axis J of the chuck body as illustrated in FIG. 12C. Moreover, upon work gripping, the top jaw 120 collides, as other factors, with the work in a state in which the certain engagement clearance and pin clearance are present, and therefore, instantaneously moves in the radial direction and the rotation direction. Accordingly, the work is gripped with the center axis O of the gripping surface 130 formed at the top jaw 120 being shifted from the rotation axis J of the chuck body.

That is, due to these factors, a problem that work positioning accuracy is degraded is caused.

The present invention has been made in view of the above-described problems, and a main object of the present invention is to provide a chuck mechanism having excellent work positioning accuracy, the chuck mechanism being configured such that raised and recessed portions engageable with each other are formed at a master jaw and a top jaw and attachment/detachment of the top jaw is performed by relative rotation of the master jaw and the top jaw along conical surfaces of the raised and recessed portions.

Solution to the Problem

The chuck mechanism according to the present invention includes a chuck body, multiple master jaws placed movably in a radial direction on a front surface of the chuck body, and top jaws each detachably attached to front surfaces of the master jaws. Each master jaw and each top jaw have, at portions facing each other in an axial direction, a raised portion and a recessed portion engageable with each other. Each of the raised and recessed portions has, at both end portions in the radial direction, conical surfaces formed by part of a conical body. Each top jaw has a gripping surface provided for gripping a work and formed by part of a circular columnar body. Upon work gripping, the center axes of the conical surfaces on a gripping side among the conical surfaces of each master jaw and each top jaw and the center axis of the gripping surface are all coincident with a rotation axis of the chuck body.

Advantages of the Invention

According to the present invention, a chuck mechanism having excellent work positioning accuracy can be provided, the chuck mechanism being configured such that raised and recessed portions engageable with each other are formed at a master jaw and a top jaw and attachment/detachment of the top jaw is performed by relative rotation of the master jaw and the top jaw along conical surfaces of the raised and recessed portions.

BRIEF DESCRIPTION OF THE DRAWINGS

FIGS. 4A to 4C are plan perspective views for describing features and advantageous effects of the chuck mechanism.

FIGS. 12A to 12C are views for describing problems of the typical chuck mechanism.

DESCRIPTION OF EMBODIMENTS

Hereinafter, an embodiment of the present invention will be described in detail with reference to the drawings. Note that the present invention is not limited to the following embodiment. Moreover, changes may be made as necessary without departing from a scope providing advantageous effects of the present invention.

Figure 1:
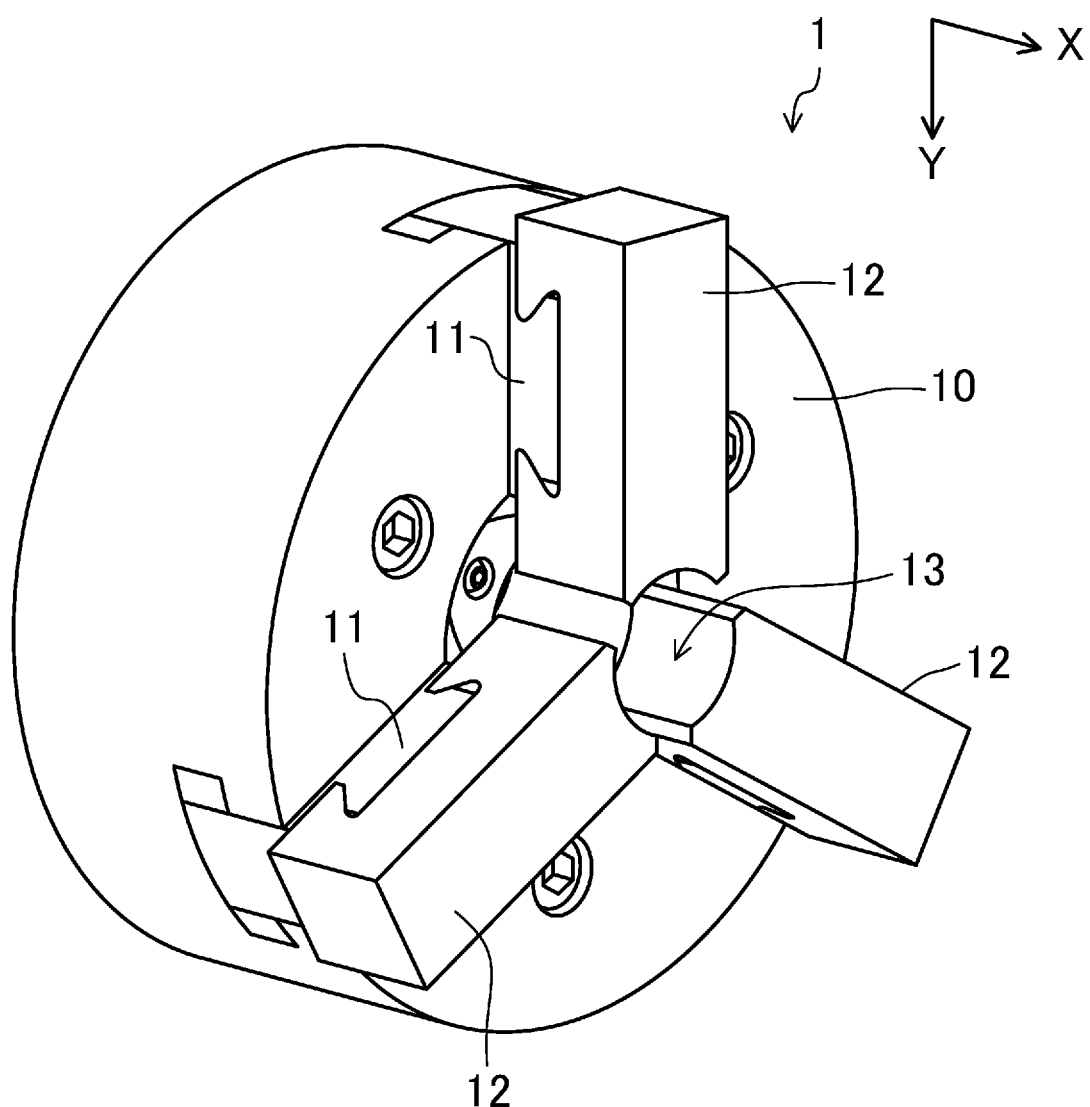
FIG. 1 is a schematic perspective view of a configuration of a chuck mechanism in one embodiment of the present invention.
Figure 2:
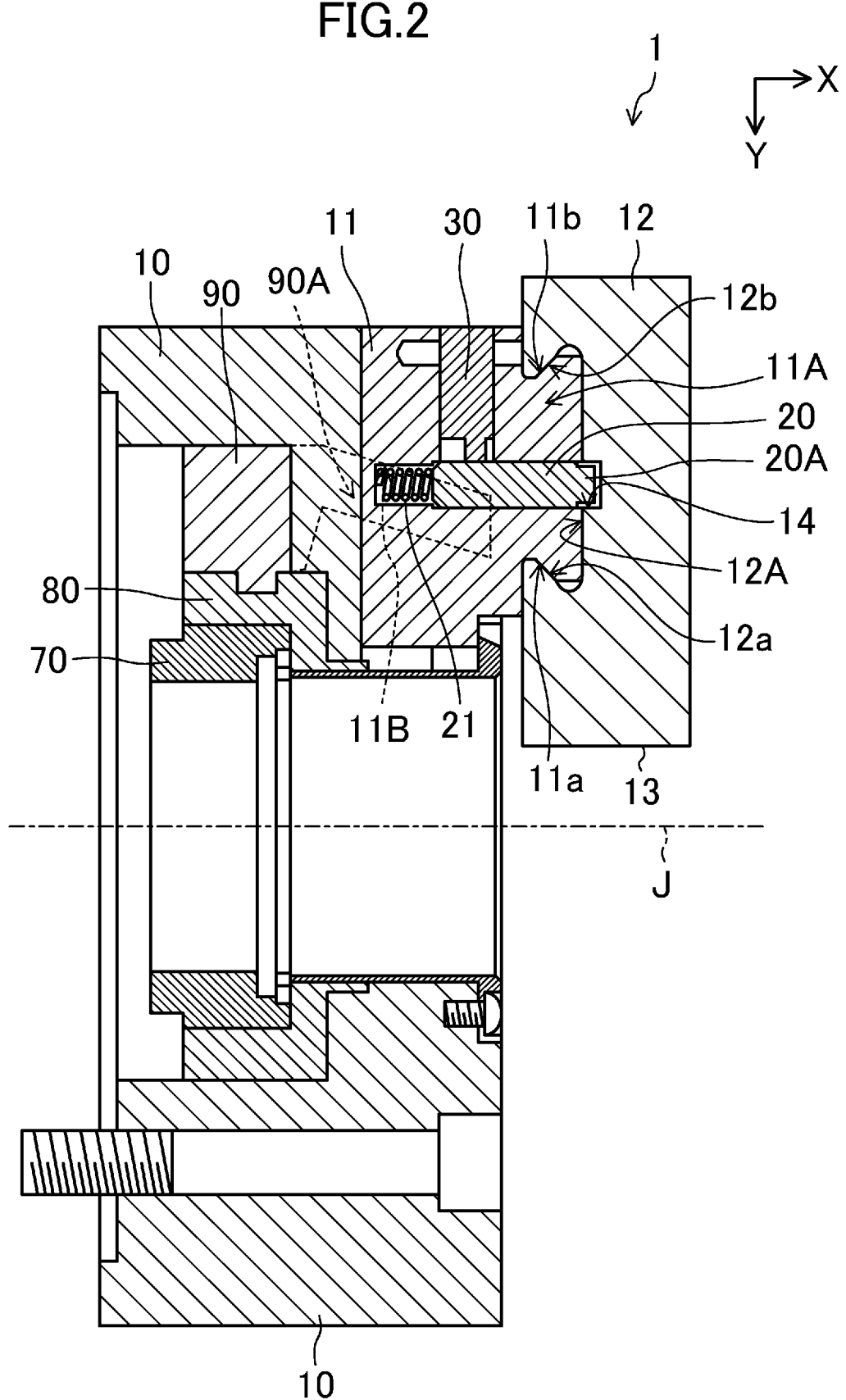
FIG. 2 is a schematic sectional view of the configuration of the chuck mechanism in one embodiment of the present invention.
Figure 3A:
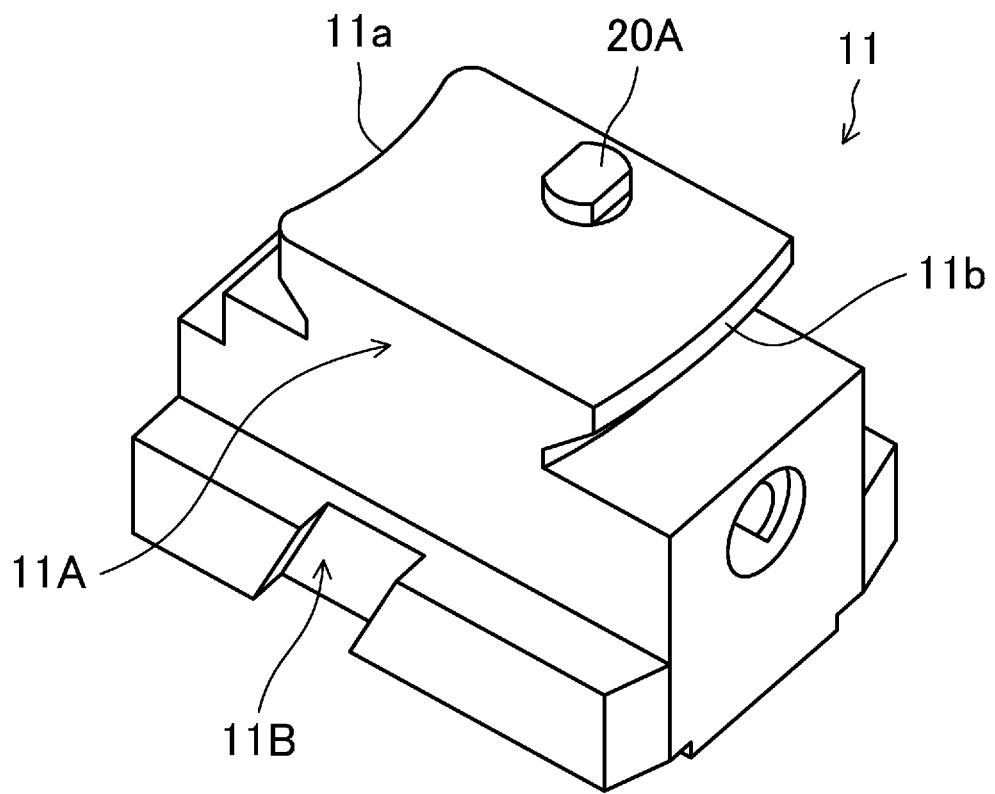
FIGS. 3A and 3B are schematic perspective views of configurations of a master jaw and a top jaw.
Figure 3B:
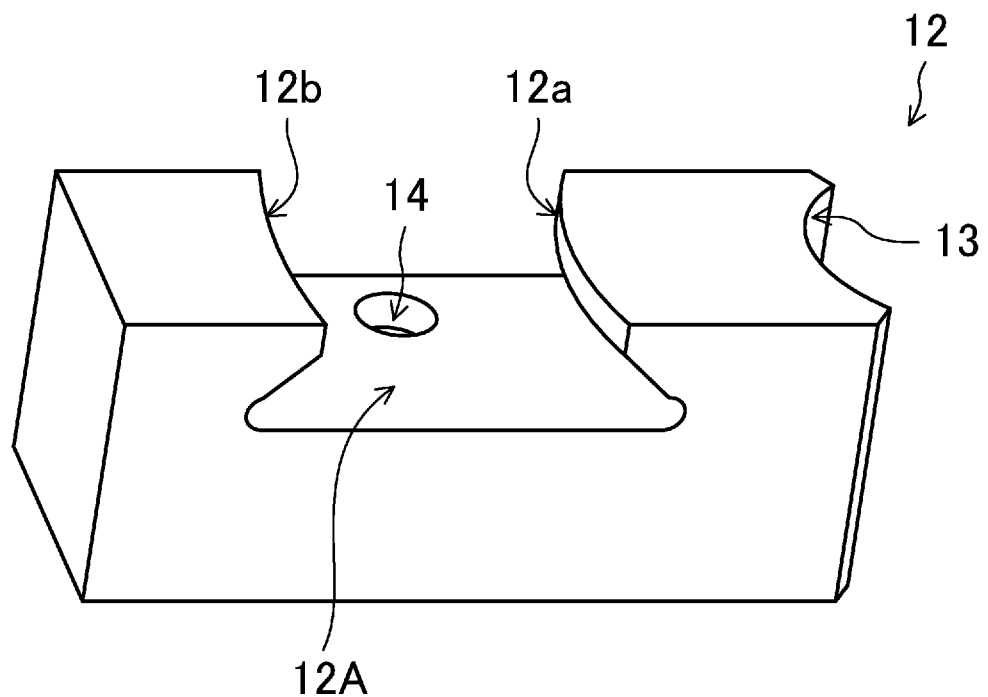

FIGS. 1 and 2 are schematic perspective and sectional views of a configuration of a chuck mechanism in one embodiment of the present invention. Moreover, FIGS. 3A and 3B are schematic perspective views of configurations of a master jaw and a top jaw in the present embodiment. Note that in description of the present embodiment, a direction X parallel to a rotation axis J of a chuck body will be referred to as an "axial direction," and a radial direction Y about the rotation axis J will be referred to as a "radial direction." Moreover, the chuck mechanism in the present embodiment is fixed to a machine tool, and is rotatable about the rotation axis J.

As illustrated in FIG. 1, a chuck mechanism 1 in the present embodiment includes a chuck body 10, multiple (three in the present embodiment) master jaws 11 placed movably in the radial direction, and top jaws 12 each detachably attached to front surfaces of the master jaws 11. Moreover, a gripping surface 13 for gripping a work is formed at the top jaw 12.

As illustrated in FIG. 2, a draw nut 70 is housed movably along the axial direction in the chuck body 10. A wedge plunger 90 engages with the draw nut 70 through a plunger 80. A wedge portion 90A inclined with respect to the axial direction is formed at the wedge plunger 90, and an inclined groove 11B in which the wedge portion 90A is fitted is formed outside the master jaw 11. With this configuration, the wedge plunger 90 moves in the axial direction in association with movement of the draw nut 70 in the axial direction, and accordingly, movement of the master jaw 11 in the radial direction is controlled.

In the present embodiment, a raised portion 11A and a recessed portion 12A engaging with each other are each formed at portions of the master jaw 11 and the top jaw 12 facing each other in the axial direction. As illustrated in FIG. 3A, the raised portion 11A formed at the master jaw 11 has, at both end portions in the radial direction, conical surfaces 11a, 11b formed by part of a conical body. Moreover, as illustrated in FIG. 3B, the recessed portion 12A formed at the top jaw 12 has, at both end portions in the radial direction, conical surfaces 12a, 12b formed by part of a conical body. Further, the top jaw 12 has the gripping surface 13 formed by part of a circular columnar body for gripping the work. The master jaw 11 and the top jaw 12 are rotated relative to each other in a circumferential direction along the conical surfaces (11a, 11b), (12a, 12b) of the raised portion 11A and the recessed portion 12A, and in this manner, the top jaw 12 is attached/detached. Note that the conical surfaces 11a, 11b of the raised portion 11A and the conical surfaces 12a, 12b of the recessed portion 12A have such an engagement clearance that the top jaw 12 can rotate.

As illustrated in FIG. 2, a movable pin 20 movable in the axial direction and a shaft 30 engaging with the movable pin 20 are arranged in the master jaw 11. Moreover, a pin hole 14 into which the movable pin 20 can be inserted is provided at the top jaw 12. The movable pin 20 described herein is biased outward (a top jaw 12 side) in the axial direction by a spring 21. By rotation of the shaft 30, the movable pin 20 movably engages with the shaft 30 in the axial direction. By such rotary motion of the shaft 30, the movable pin 20 can be moved in or out of the pin hole 14. The movable pin 20 is inserted into the pin hole 14 with the raised portion 11A and the recessed portion 12A engaging with each other, and therefore, the position of the top jaw 12 with respect to the master jaw 11 is determined. Note that a pin clearance is provided between the movable pin 20 and the pin hole 14.

In a state in which the work is gripped in the chuck mechanism 1 in the present embodiment, the center axes of the conical surfaces 11a, 12a formed on a gripping side among the conical surfaces (11a, 11b), (12a, 12b) formed at the raised portion 11A of the master jaw 11 and the recessed portion 12A of the top jaw 12 and the center axis of the gripping surface 13 formed at the top jaw 12 are all coincident with the rotation axis J of the chuck body 10. The "gripping side" described herein is a rotation axis J side of the chuck body 10 in the case of gripping the outer diameter of the work, and is the opposite side of the rotation axis J of the chuck body 10 in the case of gripping the inner diameter of the work. Moreover, the center axis of the conical surface is the center axis of the conical body forming the conical surface, and the center axis of the gripping surface is the center axis of the circular columnar body forming the gripping surface.

Next, features and advantageous effects of the chuck mechanism 1 in the present embodiment will be described with reference to FIGS. 4A to 4C.

FIG. 4A is a schematic plan perspective view of a position relationship between the master jaw 11 and the top jaw 12 before gripping of the work. The center axis C of the conical surface 11a formed on the gripping side of the master jaw 11 and the center axis C' of the conical surface 12a formed on the gripping side of the top jaw 12 as described herein are shifted from the rotation axis J (FIG. 2) of the chuck body 10. Note that the center axis C" of the gripping surface 13 formed at the top jaw 12 is formed coincident with the center axis C' of the conical surface 12a formed at the top jaw 12. Moreover, a certain engagement clearance is provided between the conical surface 11a, 11b of the master jaw 11 and the conical surface 12a, 12b of the top jaw 12. Further, a certain pin clearance is provided between the movable pin 20 and the pin hole 14. Note that for the sake of simplicity in description, the illustrated engagement clearance and the illustrated pin clearance are exaggeratingly drawn, and do not indicate actual dimensions.

In such a state, when the top jaw 12 grips the work, the conical surface 12a formed at the recessed portion 12A of the top jaw 12 is, by reactive force from the work, pressed against the conical surface 11a formed at the raised portion 11A of the master jaw 11 as illustrated in FIG. 4B. At this point, the center axis C of the conical surface 11a formed on the gripping side of the master jaw 11 and the center axis C' of the conical surface 12a formed on the gripping side of the top jaw 12 are coincident with each other. Moreover, the conical surface 11a of the master jaw 11 is formed such that the center axis C thereof is coincident with the rotation axis J of the chuck body 10 upon work gripping. Thus, the center axis C" of the gripping surface 13 formed at the top jaw 12 is formed coincident with the center axis C' of the conical surface 12a formed at the top jaw 12, and therefore, the center axis C" of the gripping surface 13 is coincident with the rotation axis J of the chuck body 10 upon work gripping.

However, as also described regarding the typical problems, there are the engagement clearance and the pin clearance in a state before work is gripped, and for this reason, the top jaw 12 instantaneously moves in the radial direction or moves in the circumferential direction along the conical surface upon work gripping (the top jaw moves violently). In this state, the engagement clearance in the radial direction is eliminated by close contact between the conical surface 11a of the master jaw 11 and the conical surface 12a of the top jaw 12 due to the reactive force from the work, but movement in the circumferential direction due to the pin clearance is not eliminated. For this reason, the work is gripped with the top jaw 12 having moved in the circumferential direction as illustrated in FIG. 4C. However, even in this case, the engagement clearance is eliminated, and therefore, a state in which the center axes C, C' of the conical surfaces 11a, 12a formed at the master jaw 11 and the top jaw 12 are coincident with each other is not different from that in the case of FIG. 4B. For this reason, the center axis C of the conical surface 11a formed at the master jaw 11 is formed coincident with the rotation axis J of the chuck body 10 upon work gripping, and therefore, a state in which the center axis C" of the gripping surface 13 is coincident with the rotation axis J of the chuck body 10 is not different from that in the case of FIG. 4B.

That is, the center axes C, C', C" of the conical surface 11a of the master jaw 11, the conical surface 12a of the top jaw 12, and the gripping surface 13 are all coincident with the rotation axis J of the chuck body 10 upon work gripping, and therefore, the center axis C" of the gripping surface 13 formed at the top jaw 12 is not shifted from the rotation axis J of the chuck body 10. As a result, even if the work is gripped with the top jaw 12 being shifted in the circumferential direction, work positioning accuracy is not degraded.

According to the chuck mechanism 1 in the present embodiment, the center axes C, C' of the conical surfaces 11a, 12a formed on the gripping side of the master jaw 11 and the top jaw 12 and the center axis C" of the gripping surface 13 formed at the top jaw 12 are all coincident with the rotation axis J of the chuck body 10. Thus, even when the certain engagement clearance is provided between the conical surface 11a, 11b of the master jaw 11 and the conical surface 12a, 12b of the top jaw 12 and the certain pin clearance is provided between the movable pin 20 and the pin hole 14, excellent work positioning accuracy can be obtained.

(First Variation)

In the above-described embodiment, even in a case where the top jaw 12 is attached to the master jaw 11 in a state in which the top jaw 12 is shifted from the master jaw 11 in the radial direction and the circumferential direction, the conical surface 12a of the top jaw 12 on the gripping side closely contacts the conical surface 11a of the master jaw 11 by means of the reactive force from the work when the top jaw 12 grips the work, and in this manner, shift of the center axis of the gripping surface 13 from the rotation axis of the chuck body 10 is prevented.

In a first variation, a method in which the conical surface 12a of the top jaw 12 on the gripping side closely contacts the conical surface 11a of the master jaw 11 before work gripping is disclosed.

Figure 5:
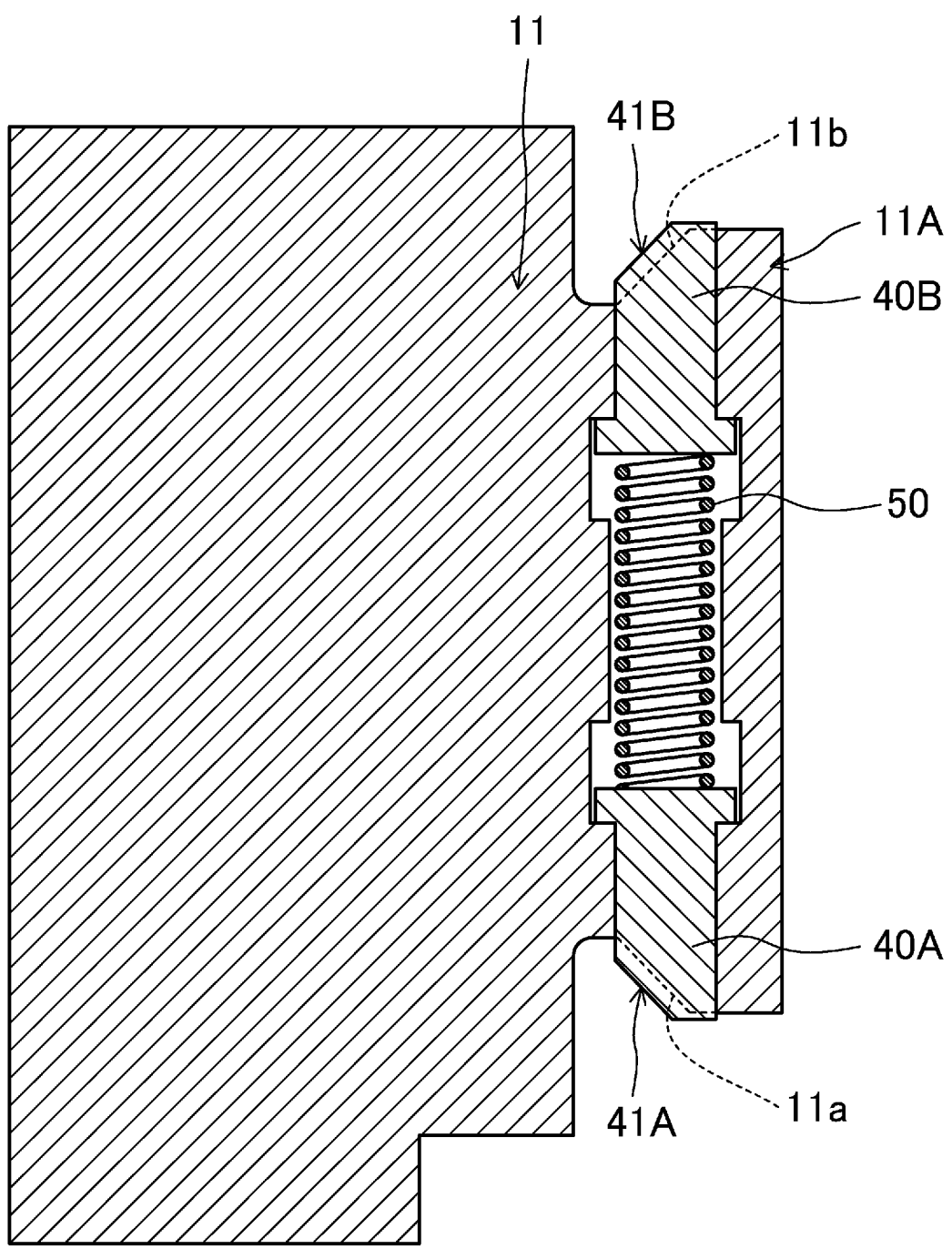
FIG. 5 is a schematic sectional view of the configuration of the master jaw in a first variation of the present invention.

FIG. 5 is a schematically sectional view of the configuration of the master jaw 11 in the first variation. Note that in FIG. 5, the movable pin 20 and the shaft 30 illustrated in FIG. 2 are omitted.

As illustrated in FIG. 5, first pressing pins 40A, 40B are housed in the raised portion 11A of the master jaw 11 through a spring 50. The first pressing pins 40A, 40B described herein are biased by the spring 50 such that tip end portions 41A, 41B thereof each protrude outward from the conical surfaces 11a, 11b.

Figure 6:
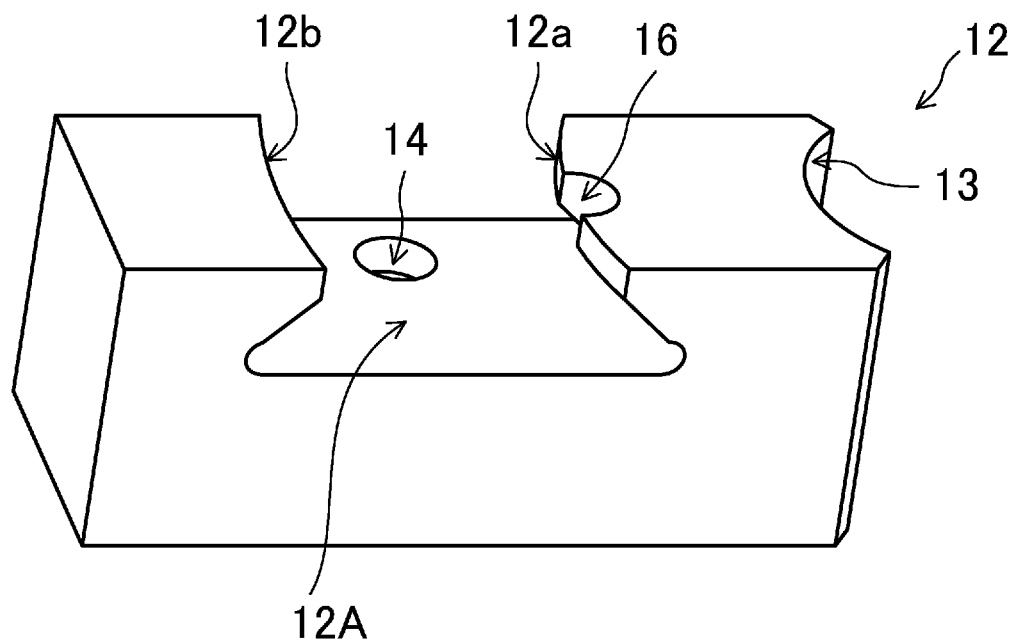
FIG. 6 is a schematic perspective view of the configuration of the top jaw in the first variation.

FIG. 6 is a schematic perspective view of the configuration of the top jaw 12 in the first variation.

As illustrated in FIG. 6, a groove portion 16 into which the tip end portion 41A of the first pressing pin 40A can be inserted is provided at the conical surface 12a of the top jaw 12 on the gripping side.

Figure 7:
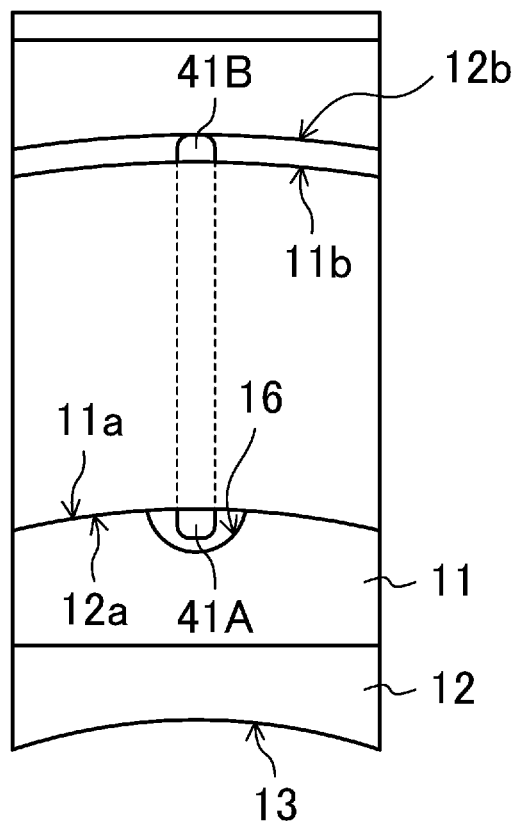
FIG. 7 is a plan perspective view of a state in which a raised portion of the master jaw and a recessed portion of the top jaw engage with each other in the first variation.

FIG. 7 is a plan perspective view of a state in which the raised portion 11A of the master jaw 11 and the recessed portion 12A of the top jaw 12 engage with each other.

As illustrated in FIG. 7, the tip end portion 41B of the first pressing pin 40B protruding from the conical surface 11b on the opposite side of the gripping side of the master jaw 11 presses the conical surface 12b of the top jaw 12 by the spring 50. On the other hand, the conical surface 11a of the master jaw 11 on the gripping side is pressed against the conical surface 12a of the top jaw 12 by reactive force from the conical surface 12b of the top jaw 12. At this point, the tip end portion 41A of the first pressing pin 40A protruding from the conical surface 11a of the master jaw 11 on the gripping side is inserted into the groove portion 16 of the top jaw 12, and therefore, the conical surfaces 11a, 12a of the master jaw 11 and the top jaw 12 closely contact each other. Note that in this state, the tip end portion 41A does not contact the top jaw 12, and therefore, receives no biasing force of the spring 50.

As described above, in the first variation, the conical surface 12a of the top jaw 12 on the gripping side can closely contact the conical surface 11a of the master jaw 11 before the work is gripped. Thus, when the work is gripped, there is no motion of instantaneously moving the top jaw 12 in response to the reactive force from the work, and therefore, the work can be more stably gripped. Moreover, all of the top jaws 12 can be, at the same attachment position, attached to the multiple master jaws 11 placed on a front surface of the chuck body 10. Thus, the position of the work can be stabilized, and high-accuracy gripping can be realized.

(Second Variation)

In the above-described first variation, the first pressing pins 40A, 40B biased such that the tip end portions 41A, 41B protrude outward of the conical surfaces 11a, 11b are housed in the raised portion 11A of the master jaw 11, but a similar pressing pin may be housed in the recessed portion 12A of the top jaw 12.

Figure 8:
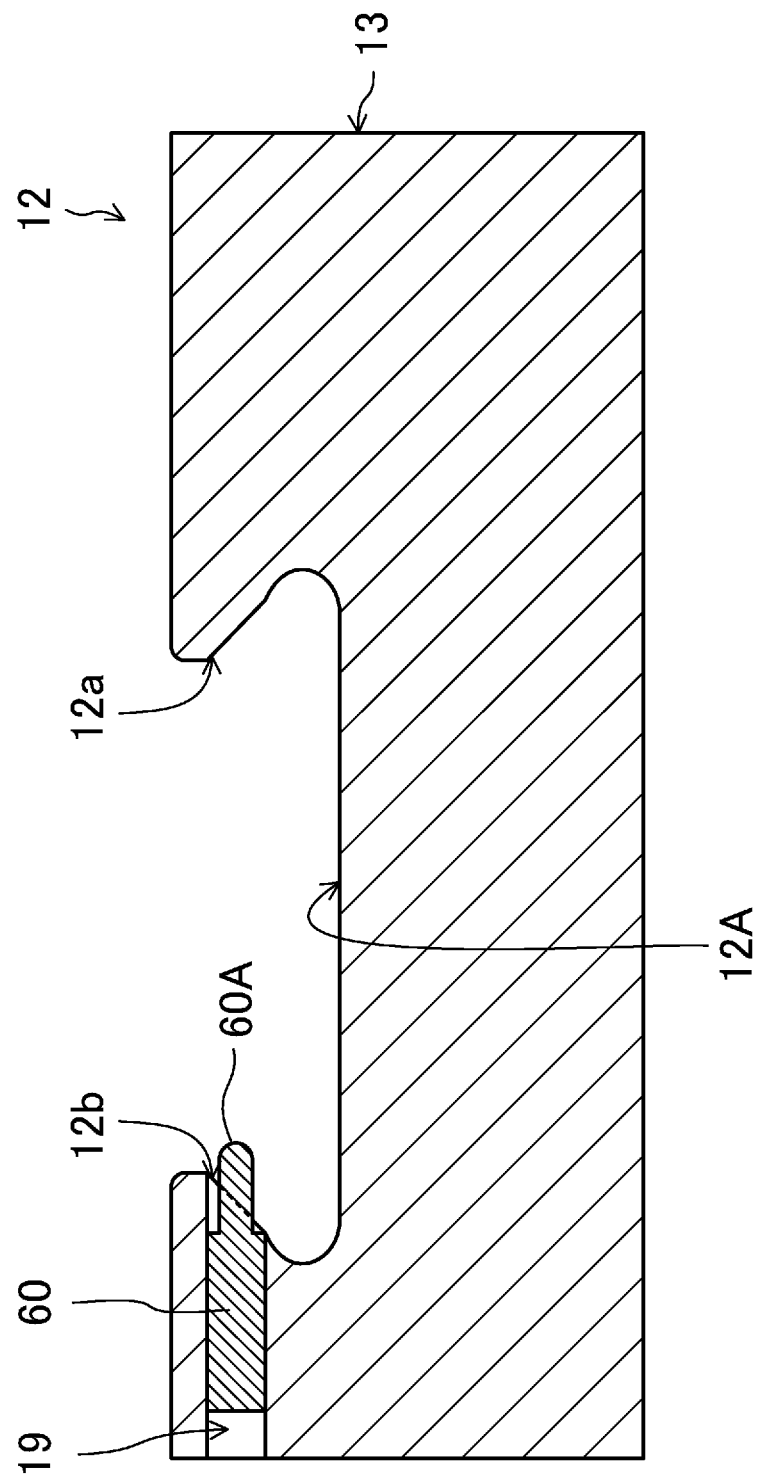
FIG. 8 is a schematic sectional view of the configuration of the top jaw in a second variation of the present invention.

FIG. 8 is a schematic sectional view of the configuration of the top jaw 12 in the second variation.

As illustrated in FIG. 8, a second pressing pin 60 biased such that a tip end portion 60A protrudes outward of the conical surface 12b on the opposite side of the gripping side is housed in a groove 19 of the recessed portion 12A of the top jaw 12. For example, a spring plunger can be used as the second pressing pin 60 described herein.

In the second variation, when the raised portion 11A of the master jaw 11 and the recessed portion 12A of the top jaw 12 are attached in an engagement state, the tip end portion 60A of the second pressing pin 60 protruding from the conical surface 12b of the top jaw 12 on the opposite side of the gripping side presses the conical surface 11b of the master jaw 11. At this point, the conical surface 11a of the master jaw 11 on the gripping side is pressed against the conical surface 12a of the top jaw 12 by pressing force from the second pressing pin 60. Accordingly, the conical surfaces 11a, 12a of the master jaw 11 and the top jaw 12 closely contact each other. As a result, when the work is gripped, there is no motion of instantaneously moving the top jaw 12 in response to the reactive force from the work, and therefore, the work can be more stably gripped. Moreover, all of the top jaws 12 can be, at the same attachment position, attached to the multiple master jaws 11 placed on the front surface of the chuck body 10. Thus, the position of the work can be stabilized, and high-accuracy gripping can be realized. Further, it is enough to provided only in the recessed portion 12A on the opposite side of the gripping side, and therefore, the second pressing pin 60 can be realized with a simple structure.

(Third Variation)

In the chuck mechanism in the above-described embodiment, when the top jaws 12 grip the work, the conical surface 12a of each top jaw 12 is pressed against the conical surface 11a of the master jaw 11 by the reactive force from the work. Thus, even when the certain engagement clearance is provided between the conical surface 11a, 11b of the master jaw 11 and the conical surface 12a, 12b of the top jaw 12, the top jaw 12 can firmly engage with the master jaw 11.

In the third variation, an aspect in which the top jaw 12 is fixed to the master jaw 11 with a bolt is disclosed.

Figure 9:
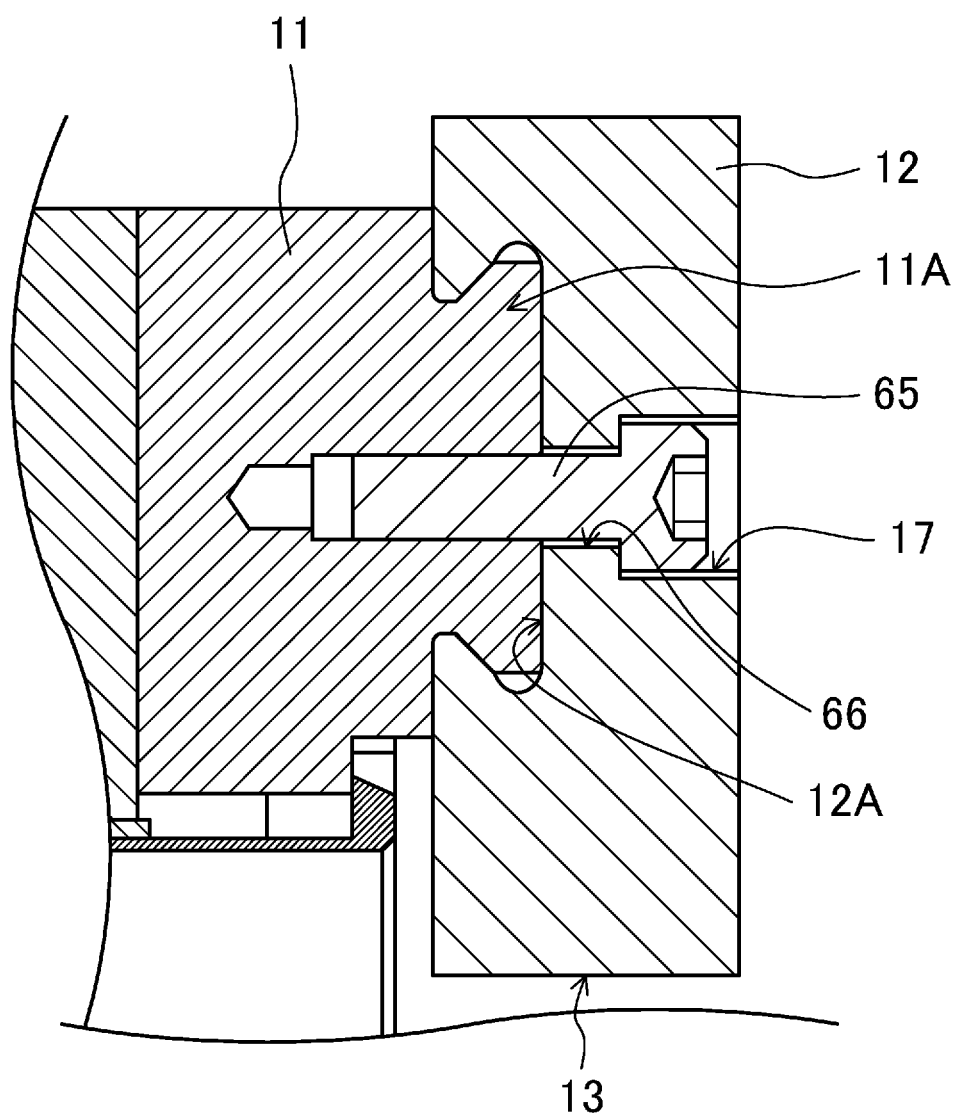
FIG. 9 is a sectional view of a state in which the top jaw is fixed to the master jaw with a bolt in a third variation of the present invention.
Figure 10:
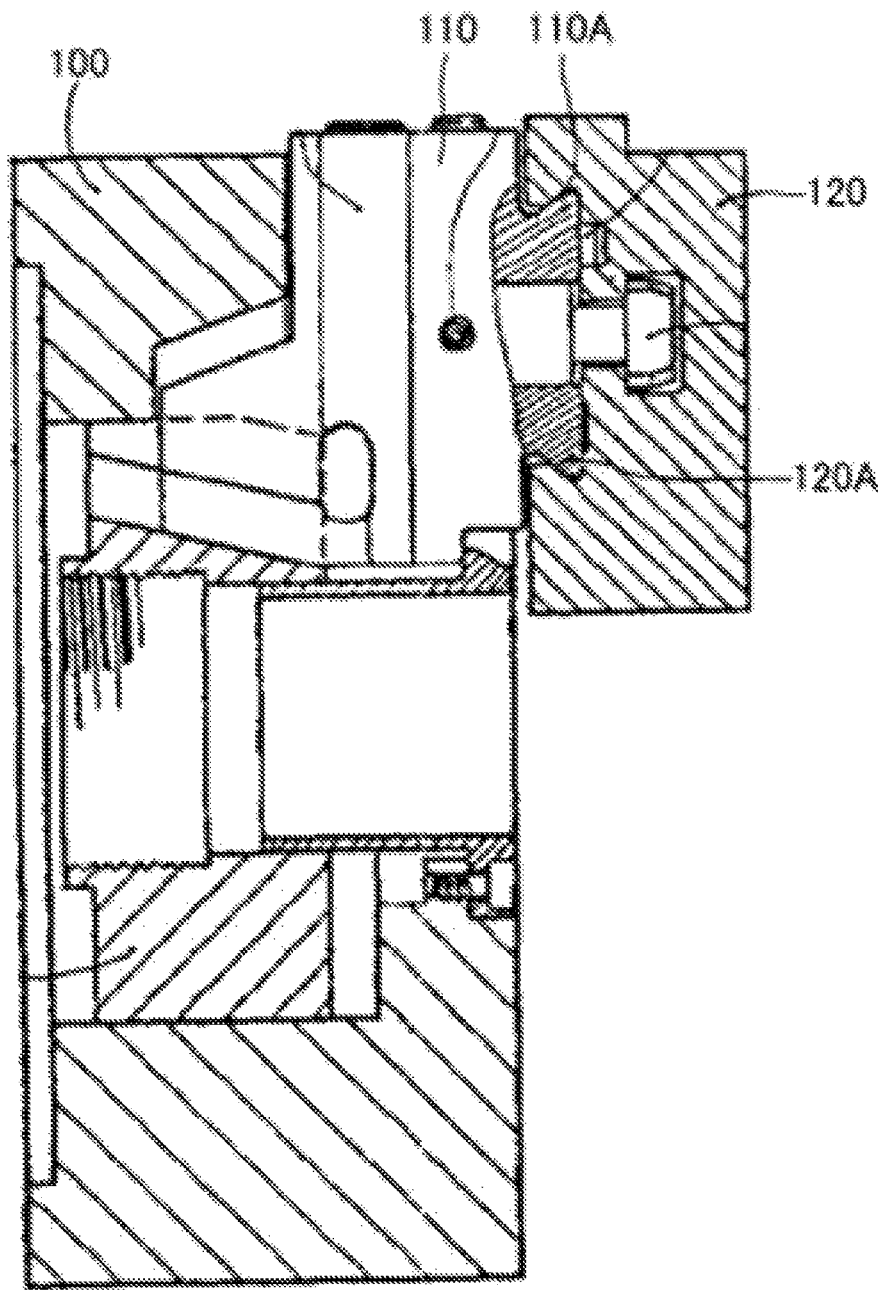
FIG. 10 is a sectional view of a typical chuck mechanism.
Figure 11A:
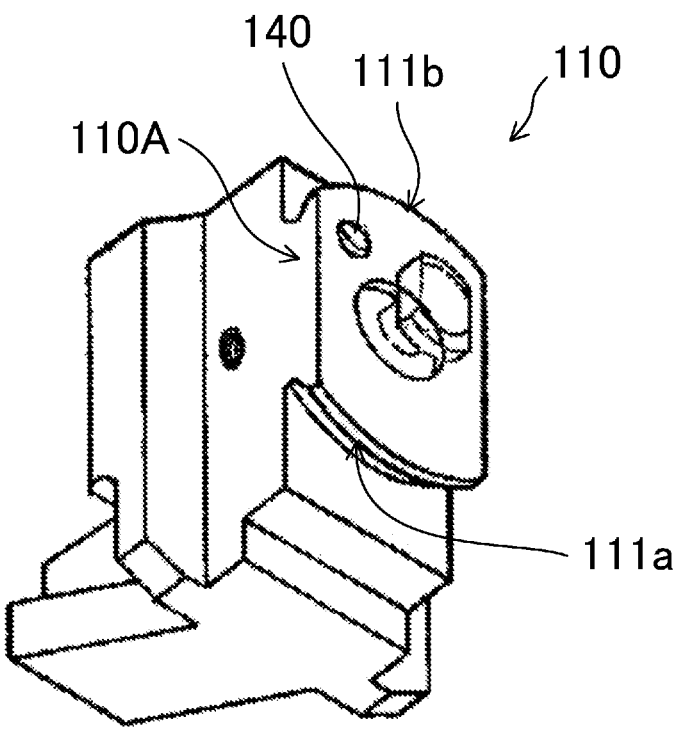
FIGS. 11A and 11B are schematic perspective views of configurations of a typical master jaw and a typical top jaw.
Figure 11B:
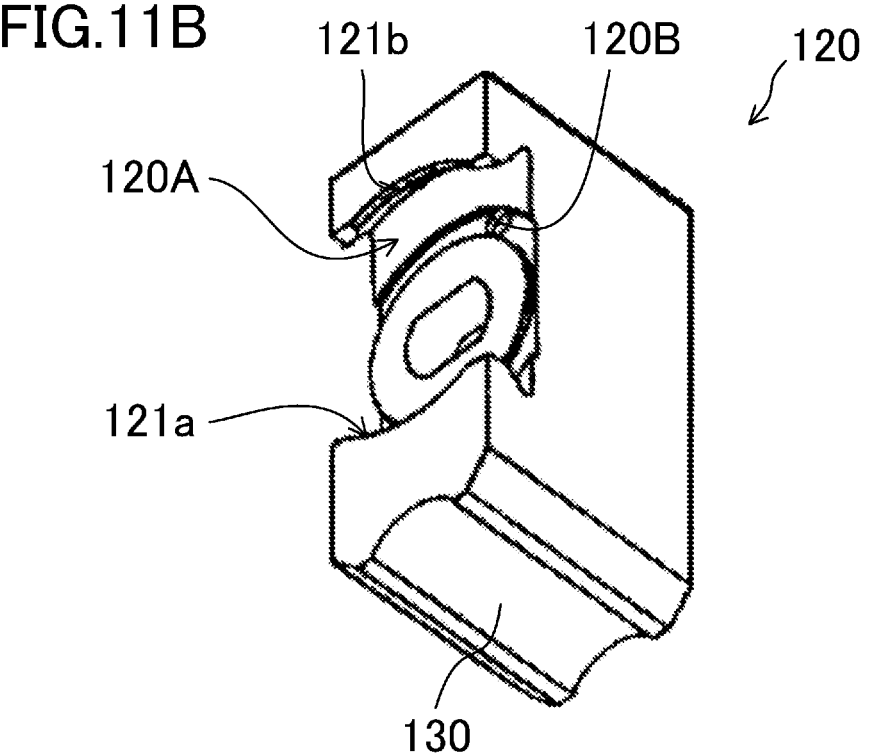

FIG. 9 is a sectional view of a state in which the raised portion 11A of the master jaw 11 and the recessed portion 12A of the top jaw 12 engage with each other and are fixed to each other with a bolt 65 in the third variation.

As illustrated in FIG. 9, the bolt 65 is inserted into a countersunk hole 66 formed at the top jaw 12 to fix the top jaw 12 to the master jaw 11, but a certain clearance is provided between the bolt 65 and the countersunk hole 66. Thus, in some cases, the top jaw 12 is fixed to the master jaw 11 with the top jaw 12 being shifted from the master jaw 11 in the radial direction and the circumferential direction. In these cases, the center axis of the gripping surface 13 formed at the top jaw 12 is shifted from the rotation axis of the chuck body 10.

In the third variation, the top jaw 12 is fixed to the master jaw 11 while the conical surface 12a of the top jaw 12 on the gripping side is being pressed in close contact with the conical surface 11a of the master jaw 11. Accordingly, the top jaw 12 can be fixed to the master jaw 11 such that the center axis of the gripping surface 13 formed at the top jaw 12 is coincident with the rotation axis of the chuck body 10 upon work gripping. As a result, excellent work positioning accuracy can be obtained.

The present invention has been described above with reference to the preferred embodiments, but such description is not a limited matter. Needless to say, various modifications can be made. For example, in the above-described embodiment and the above-described first and second variations, the gripping surface 13 for gripping the work is, assuming gripping of the outer diameter of the work, formed at a rotation-axis-side portion of the top jaw 12. However, in the case of gripping the inner diameter of the work, the gripping surface 13 may be formed at a portion of the top jaw 12 opposite to the rotation axis. In this case, the center axes of the conical surfaces 11b, 12b of the master jaw 11 and the top jaw 12 on the gripping side and the center axis of the gripping surface 13 are all coincident with the rotation axis of the chuck body 10 upon work gripping, and therefore, similar advantageous effects can be obtained. Alternatively, a pair of gripping surfaces 13 for outer diameter gripping and inner diameter gripping may be formed at the top jaw 12.

Moreover, in the above-described embodiment, the movable pin 20 provided at the master jaw 11 is inserted into the pin hole 14 provided at the top jaw 12, and in this manner, the position of the top jaw 12 is determined. However, such a positioning mechanism is not necessarily provided. Specifically, in the above-described first and second variations, the tip end portion of the first pressing pin 40B, 60 is pressed against the conical surface of the top jaw 12 or the master jaw 11 so that the position of the top jaw 12 can be determined. Thus, the positioning mechanism as disclosed in the above-described embodiment is not necessarily provided.

Further, in the above-described first and second variations, the first pressing pins 40A, 40B and the second pressing pin 60 have been disclosed as a unit configured to press the conical surface of the master jaw 11 or the top jaw 12, but the present invention is not limited to above. Various pressing units can be employed. For example, in the second variation, the spring plunger has been described as an example of the second pressing pin 60, but a set screw etc. may be used.

DESCRIPTION OF REFERENCE CHARACTERS

1 Chuck Mechanism
10 Chuck Body
11 Master Jaw

11a Raised Portion
11a, 11b Conical Surface
12 Top Jaw
12a Recessed Portion
12a, 12b Conical Surface
13 Gripping Surface
14 Pin Hole
16 Groove Portion
20 Movable Pin
40a, 40b First Pressing Pin (Pressing Unit)
41a, 41b Tip End Portion
60 Second Pressing Pin (Pressing Unit)
60a Tip End Portion

The invention claimed is:

1. A chuck mechanism comprising:
a chuck body;
multiple master jaws placed movably in a radial direction on a front surface of the chuck body; and
top jaws each detachably attached to front surfaces of the master jaws,
wherein
each master jaw and each top jaw have, at portions facing each other in an axial direction, a raised portion and a recessed portion engageable with each other,
each of the raised and recessed portions has, at both end portions in the radial direction, conical surfaces formed by part of a conical body,
each top jaw has a gripping surface provided for gripping a work and formed by part of a circular columnar body, and
upon work gripping, center axes of conical surfaces on a gripping side among the conical surfaces of each master jaw and each top jaw and a center axis of the gripping surface are all coincident with a rotation axis of the chuck body.

2. The chuck mechanism according to claim 1, wherein:
each top jaw is attached/detached in such a manner that the master jaw and the top jaw are rotated relative to each other in a circumferential direction along the conical surfaces of the raised and recessed portions.

3. The chuck mechanism according to claim 2, wherein:
a movable pin movable in the axial direction is provided in each master jaw,
a pin hole into which the movable pin is able to be inserted is provided at each top jaw, and
a position of the each top jaw with respect to the each master jaw is determined in such a manner that the movable pin is inserted into the pin hole with the raised and recessed portions engaging with each other.

4. The chuck mechanism according to claim 3, wherein:
in the raised portion of each master jaw, a first pressing member biased such that a tip end portion thereof protrudes outward of the conical surface of each end portion of the raised portion in the radial direction is housed,
each top jaw includes, at the conical surface on the gripping side, a groove portion into which the first pressing member is able to be inserted, and
the tip end portion of the first pressing member protruding from the conical surface of each master jaw opposite to the gripping side is pressed against the conical surface of each top jaw in a state in which the raised and recessed portions engage with each other, and the conical surfaces of the each master jaw and the each top jaw closely contact each other in a state in which the tip end portion of the first pressing member protruding from the conical surface of the each master jaw on the gripping side is inserted into the groove portion of the each top jaw.

5. The chuck mechanism according to claim 3, wherein:
in the recessed portion of each top jaw, a second pressing member biased such that a tip end portion thereof protrudes outward of the conical surface opposite to the gripping side is housed, and
in a state in which the raised and recessed portions engage with each other, the tip end portion of the second pressing member protruding from the conical surface of each top jaw opposite to the gripping side is pressed against the conical surface of each master jaw, and the conical surfaces of the each master jaw and the each top jaw on the gripping side are closely contact each other.

6. The chuck mechanism according to claim 2, wherein:
in the raised portion of each master jaw, a first pressing member biased such that a tip end portion thereof protrudes outward of the conical surface of each end portion of the raised portion in the radial direction is housed,
each top jaw includes, at the conical surface on the gripping side, a groove portion into which the first pressing member is able to be inserted, and
the tip end portion of the first pressing member protruding from the conical surface of each master jaw opposite to the gripping side is pressed against the conical surface of each top jaw in a state in which the raised and recessed portions engage with each other, and the conical surfaces of the each master jaw and the each top jaw closely contact each other in a state in which the tip end portion of the first pressing member protruding from the conical surface of the each master jaw on the gripping side is inserted into the groove portion of the each top jaw.

7. The chuck mechanism according to claim 2, wherein:
in the recessed portion of each top jaw, a second pressing member biased such that a tip end portion thereof protrudes outward of the conical surface opposite to the gripping side is housed, and
in a state in which the raised and recessed portions engage with each other, the tip end portion of the second pressing member protruding from the conical surface of each top jaw opposite to the gripping side is pressed against the conical surface of each master jaw, and the conical surfaces of the each master jaw and the each top jaw on the gripping side are closely contact each other.

8. The chuck mechanism according to claim 1, wherein:
a movable pin movable in the axial direction is provided in each master jaw,
a pin hole into which the movable pin is able to be inserted is provided at each top jaw, and
a position of the each top jaw with respect to the each master jaw is determined in such a manner that the movable pin is inserted into the pin hole with the raised and recessed portions engaging with each other.

9. The chuck mechanism according to claim 8, wherein:
in the raised portion of each master jaw, a first pressing member biased such that a tip end portion thereof protrudes outward of the conical surface of each end portion of the raised portion in the radial direction is housed,
each top jaw includes, at the conical surface on the gripping side, a groove portion into which the first pressing member is able to be inserted, and
the tip end portion of the first pressing member protruding from the conical surface of each master jaw opposite to the gripping side is pressed against the conical surface of each top jaw in a state in which the raised and recessed portions engage with each other, and the conical surfaces of the each master jaw and the each top jaw closely contact each other in a state in which the tip end portion of the first pressing member protruding from the conical surface of the each master jaw on the gripping side is inserted into the groove portion of the each top jaw.

10. The chuck mechanism according to claim 8, wherein:
in the recessed portion of each top jaw, a second pressing member biased such that a tip end portion thereof protrudes outward of the conical surface opposite to the gripping side is housed, and
in a state in which the raised and recessed portions engage with each other, the tip end portion of the second pressing member protruding from the conical surface of each top jaw opposite to the gripping side is pressed against the conical surface of each master jaw, and the conical surfaces of the each master jaw and the each top jaw on the gripping side are closely contact each other.

11. The chuck mechanism according to claim 1, wherein:
in the raised portion of each master jaw, a first pressing member biased such that a tip end portion thereof protrudes outward of the conical surface of each end portion of the raised portion in the radial direction is housed,
each top jaw includes, at the conical surface on the gripping side, a groove portion into which the first pressing member is able to be inserted, and
the tip end portion of the first pressing member protruding from the conical surface of each master jaw opposite to the gripping side is pressed against the conical surface of each top jaw in a state in which the raised and recessed portions engage with each other, and the conical surfaces of the each master jaw and the each top jaw closely contact each other in a state in which the tip end portion of the first pressing member protruding from the conical surface of the each master jaw on the gripping side is inserted into the groove portion of the each top jaw.

12. The chuck mechanism according to claim 1, wherein
in the recessed portion of each top jaw, a second pressing member biased such that a tip end portion thereof protrudes outward of the conical surface opposite to the gripping side is housed, and
in a state in which the raised and recessed portions engage with each other, the tip end portion of the second pressing member protruding from the conical surface of each top jaw opposite to the gripping side is pressed against the conical surface of each master jaw, and the conical surfaces of the each master jaw and the each top jaw on the gripping side are closely contact each other.

* * * * *